United States Patent
Taniguchi

(10) Patent No.: US 6,775,018 B1
(45) Date of Patent: Aug. 10, 2004

(54) SAFETY DEVICE

(75) Inventor: Toshio Taniguchi, Asaka (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 417 days.

(21) Appl. No.: 09/712,289

(22) Filed: Nov. 15, 2000

(30) Foreign Application Priority Data

Nov. 15, 1999 (JP) .......................................... 11-324283

(51) Int. Cl.$^7$ .......................................... G06F 15/00
(52) U.S. Cl. ..................... 358/1.14; 300/90; 358/1.7; 700/79; 701/45; 372/38.02; 372/38.03; 372/38.09
(58) Field of Search .................. 372/29.01, 29.015, 372/38.02–38.09; 250/205; 315/149; 345/90, 207, 214, 27; 399/47, 88, 90; 700/223, 224, 228; 398/135; 358/1.14; 340/507, 517–521, 524, 532, 545.1, 557, 568.2, 593, 644, 3.1, 3.43, 679, 686.1, 508

(56) References Cited

U.S. PATENT DOCUMENTS

| | | | |
|---|---|---|---|
| 4,086,659 A | * | 4/1978 | Cizmic et al. ............ 360/73.03 |
| 4,776,433 A | * | 10/1988 | Lagree et al. ............... 187/316 |
| 4,785,456 A | * | 11/1988 | Kaplan ..................... 372/38.09 |
| 4,856,011 A | * | 8/1989 | Shimada et al. ............... 372/38 |
| 4,934,694 A | * | 6/1990 | McIntosh ....................... 482/9 |
| 5,163,063 A | * | 11/1992 | Yoshikawa et al. ...... 372/38.02 |
| 5,301,347 A | * | 4/1994 | Kensky ....................... 700/267 |
| 5,428,923 A | * | 7/1995 | Waggamon ................... 49/28 |
| 5,657,132 A | * | 8/1997 | Samii ......................... 358/296 |
| 5,993,039 A | * | 11/1999 | Crill ............................ 700/79 |
| 6,052,634 A | * | 4/2000 | Pathe et al. .................. 701/45 |
| 6,160,955 A | * | 12/2000 | Bicciato ..................... 388/811 |

FOREIGN PATENT DOCUMENTS

| | | |
|---|---|---|
| JP | 5345458 | 12/1993 |
| JP | 5-345458 | * 12/1993 |

* cited by examiner

Primary Examiner—Michael Razavi
Assistant Examiner—Faranak Fouladi
(74) Attorney, Agent, or Firm—Birch, Stewart, Kolasch & Birch, LLP

(57) ABSTRACT

A safety device for a printer has a first switch and a second switch that separately determines whether a door of the printer is open or closed. When the door is open (in the state that causes danger), the safety device stops driving systems of the printer with software when the second determining device determines that the door is open and stops the driving systems with hardware when the first determining device determines that door is open. Therefore, the safety device can completely stop the driving systems.

12 Claims, 6 Drawing Sheets

F I G. 4

| DOOR OF PRINTER | SW1 | SW2 |
|---|---|---|
| CLOSED | CLOSED | OPEN |
| OPEN | OPEN | CLOSED |

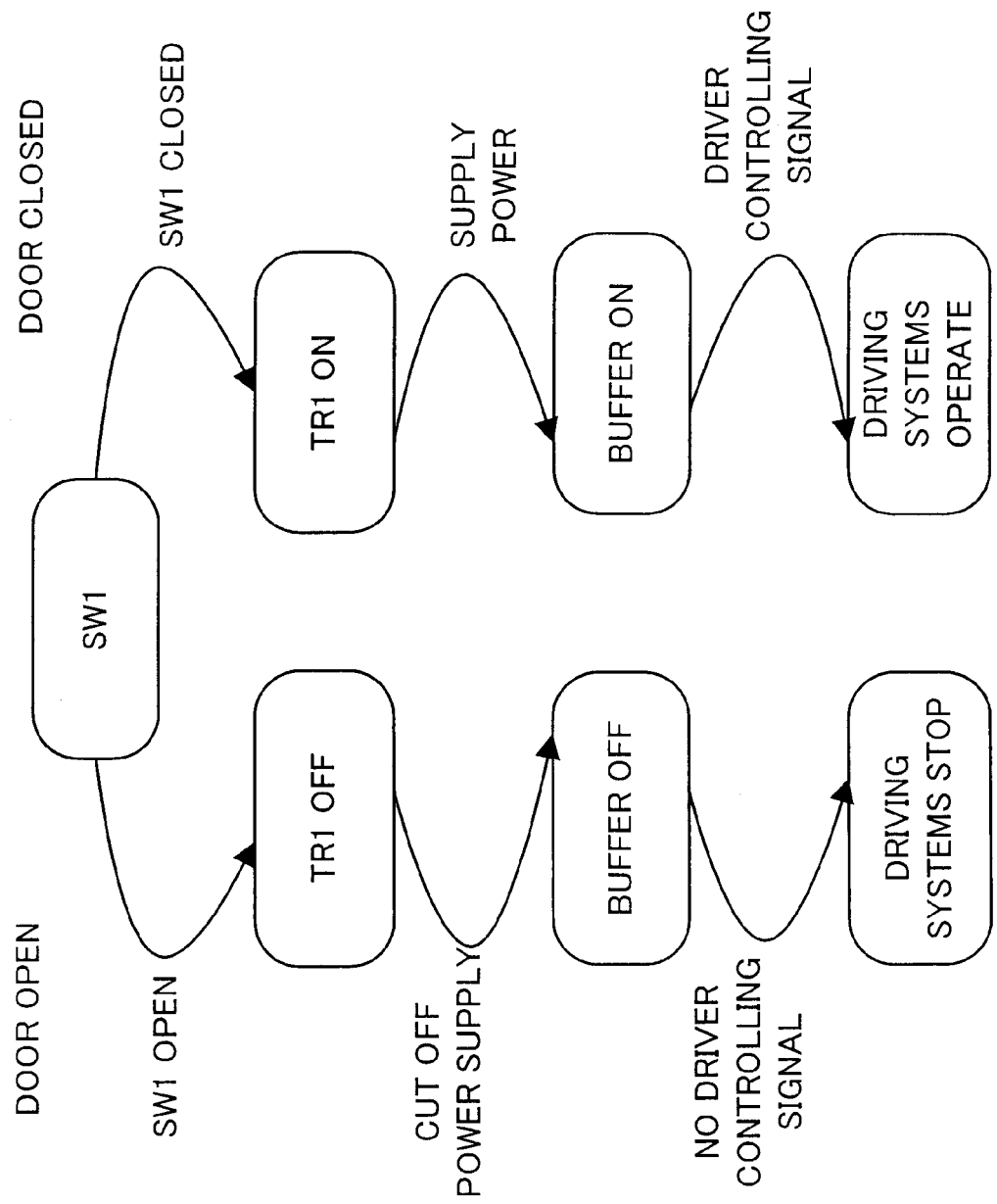

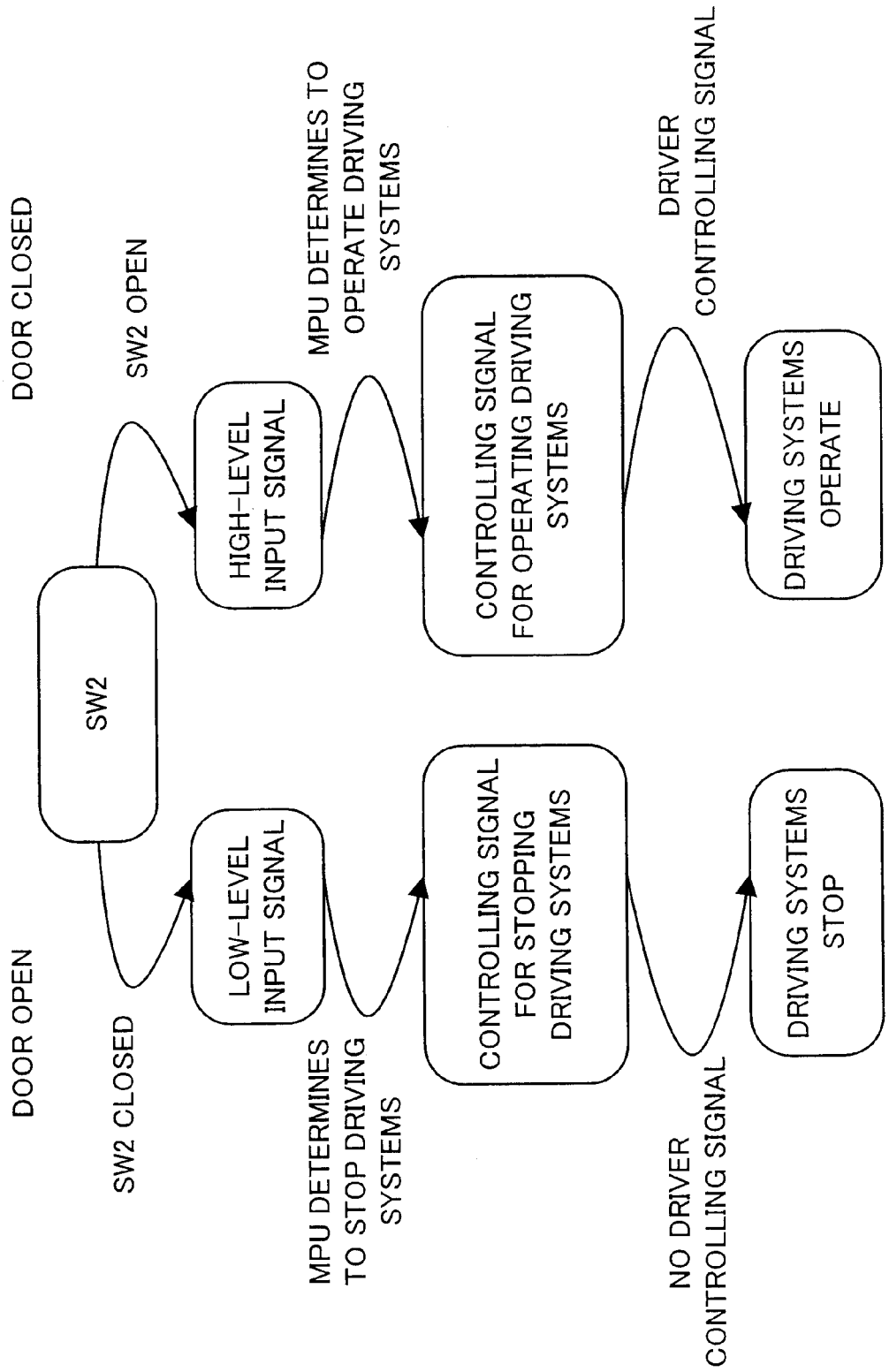

SAFETY DEVICE

BACKGROUND OF THE INVENTION

1. Field of the Invention

The present invention relates generally to a safety device, and more particularly to a safety device that completely stops a driving system of an electric machine such as a printer or an industrial machine.

2. Description of Related Art

Japanese Patent Provisional Publication No. 5-345458 discloses a safety device for a laser printer. Since a laser of the laser printer emits a laser beam that is harmful to human eyes, the safety device cuts off the power supply to the laser to guarantee the user's safety when the user opens a door of the printer.

The safety device has two switches that open and close according to whether the door of the printer is open or closed. When the user opens the door, the switches open or close to stop the operation of the printer. When the user opens the door, the safety device temporarily stores a signal indicating whether one of the switches is open or closed and keeps a signal indicating whether the other switch is open or closed for a predetermined time to completely stop the laser.

However, the safety device needs a complicated circuit that processes the signals from the switches. Thus, the circuit is unreliable and expensive.

SUMMARY OF THE INVENTION

In view of the foregoing, it is an object of the present invention to provide a reliable safety device that can completely stop a driving system with a simple and inexpensive circuit.

To achieve the above-mentioned object, the present invention is directed to a safety device comprising: a first determining device and a second determining device which separately determine whether or not an object is in a state that causes danger; a power supplying/cutting device which supplies power to a buffer when the first determining device determines that the object is not in the state that causes danger, and which cuts off the power supply to the buffer when the first determining device determines that the object is in the state that causes danger; a controlling device which outputs a controlling signal for operating a driving system to the buffer when the second determining device determines that the object is not in the state that causes danger, and which outputs a controlling signal for stopping the driving system to the buffer when the second determining device determines that the object is in the state that causes danger; and the buffer which outputs a driver controlling signal to the driving system to operate the driving system when the power supplying/cutting device supplies the power to the buffer and the controlling device outputs the controlling signal for operating the driving system to the buffer, and which does not output the driver controlling signal to the driving system to stop the driving system when the power supplying/cutting device cuts off the power supply to the buffer and the controlling device outputs the controlling signal for stopping the driving system to the buffer.

According to the present invention, the first determining device and the second determining device separately determine whether or not the object provided in the apparatus to which the safety device is applied is in the state that causes danger. The object may be a door, a moving part, etc. provided in the apparatus to which the safety device is applied. When the object is not in the state that causes danger, the power supplying/cutting device supplies the power to the buffer, and the controlling device outputs the controlling signal for operating the driving system to the buffer. Then, the buffer outputs the driver controlling signal to the driving system to operate the driving system. The driving system may be any electric device such as a power driver (e.g., an electric motor), a laser, a light emitting device and a heater, or a driving circuit for any of them.

When the object is in the state that causes danger, the power supplying/cutting device cuts off the power supply to the buffer, and the controlling device outputs the controlling signal for stopping the driving system to the buffer. The buffer does not output the driver controlling signal to the driving system to stop the driving system.

The safety device stops the driving system with the software when the second determining device determines that the object is in the state that causes danger and stops the driving system with the hardware when the first determining device determines that the object is in the state that causes danger. Therefore, the safety device can completely stop the driving system.

The first determining device and the second determining device may be switches that open and close according to whether or not the object is in the state that causes danger, or sensors that convert the information indicating the state of the object into an electric signal.

The power supplying/cutting device may be a transistor that turns ON and OFF according to whether or not the first determining device determines that the object is in the state that causes danger. Thus, the processing circuit for processing the information from the two determining devices can be simplified as one transistor and one buffer IC.

The buffer may comprise a plurality of input/output parts; and hence, the safety device can simultaneously stop a plurality of driving systems when at least one of the first and second determining devices determines that the object is in the state that causes danger.

The determining devices may determine whether a door of a printer is open or closed so that the safety device stops the driving system of the printer when the door is open. The determining devices may determine whether a paper tray of a printer is loaded in the printer or drawn from the printer so that the safety device stops the driving system of the printer when the paper tray is drawn from the printer.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 4 is a table showing whether the switches SW1 and SW2 are open or closed when a door of the printer is open and closed;

FIG. 5 is a diagram showing flows of control by the switch SW1; and

FIG. 6 is a diagram showing flows of control by the switch SW2.

DETAILED DESCRIPTION OF THE PREFERRED EMBODIMENT

This invention will be described in further detail by way of example with reference to the accompanying drawings.

Figure 1:
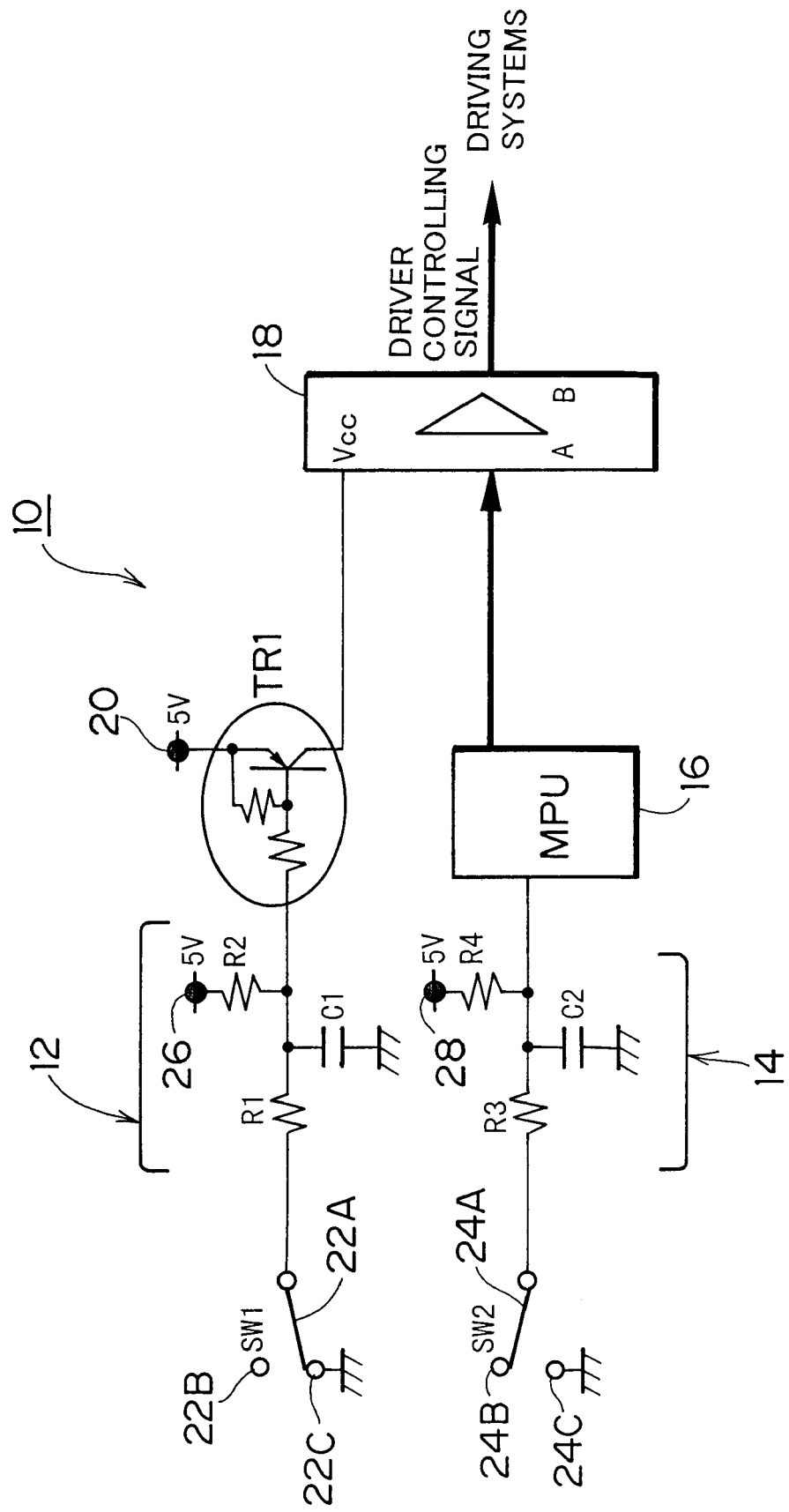
FIG. 1 is a circuit diagram showing an embodiment of a safety device according to the present invention.

FIG. 1 is a circuit diagram showing an embodiment of a safety device 10 according to the present invention. The safety device 10 comprises two switches SW1 and SW2, determining circuit parts 12 and 14 that determine whether the switches SW1 and SW2 are open or closed, a micro processing unit (MPU) 16 that is equivalent to a controlling part, a buffer 18, a power source part 20 (+5V) for the buffer 18, and a transistor TR1 that supplies power to the buffer 18 and cuts off the power supply.

The switches SW1 and SW2 have moving contacts 22A and 24A, respectively, and each of the moving contacts 22A and 24A moves between two stationary contacts. When the moving contact 22A is on one stationary contact 22B of the switch SW1, the switch SW1 is open. When the moving contact 22A is on the other stationary contact 22C that is grounded, the switch SW1 is closed. When the moving contact 24A is on one stationary contact 24B of the switch SW2, the switch SW2 is open. When the moving contact 24A is on the other stationary contact 24C that is grounded, the switch SW2 is closed.

The determining circuit part 12 that determines whether the switch SW1 is open or closed has a resistor R1, a capacitor C1, a power source part 26 (+5V) and a resistor R2. The anode of the capacitor C1 is connected to the moving contact 22A through the resistor R1, and the cathode of the capacitor C1 is grounded. The anode of the capacitor C1 is also connected to the power source part 26 through the resistor R2, and is connected to the base of the transistor TR1.

The emitter of the transistor TR1 is connected to the power source part 20, and the collector of the transistor TR1 is connected to a power input terminal Vcc of the buffer 18. When the switch SW1 is closed, the transistor TR1 turns ON to supply the power to the buffer 18. When the switch SW1 is opened, the transistor TR1 turns OFF to cut off the power supply to the buffer 18.

The buffer 18 is an IC with a function of power-down protection. The buffer 18 does not output any signal without breaking down even if a signal is inputted when the power is not supplied to the buffer 18, and the function is also called the partial-power down function. The buffer 18 is on the market, and is, for example, the 74LV541A made by Texas Instruments, Inc.

A control signal of at least one bit is outputted from the MPU 16 to the buffer 18, which outputs a driver control signal according to the control signal. In case of an eight-bit buffer, a signal of up to eight bits can be inputted and outputted. The buffer 18 outputs the driver control signal to corresponding driving systems, which operate according to the driver control signal.

The determining circuit part 14 that determines whether the switch SW2 is open or closed has a resistor R3, a capacitor C2, a power source part 28 (+5V) and a resistor R4. The anode of the capacitor C2 is connected to the moving contact 24A through the resistor R3, and the cathode of the capacitor C2 is grounded. The anode of the capacitor C2 is also connected to the power source part 28 through the resistor R4, and is connected to a general-use input port of the MPU 16. A signal indicating whether the switch SW2 is open or closed is outputted from the determining circuit part 14 to the MPU 16.

When the switch SW2 is open, a high-level input signal is inputted to the MPU 16, which outputs the control signal for operating the driving systems to the buffer 18. Then, the buffer 18 outputs the driver control signal to the driving systems, which operate according to the driver control signal.

When the switch SW2 is closed, a low-level input signal is inputted to the MPU 16, which outputs the control signal (Low signal) for stopping the driving systems to the buffer 18. In this case, the buffer 18 does not output the driver control signal to the driving systems, which stop operating.

Figure 2:
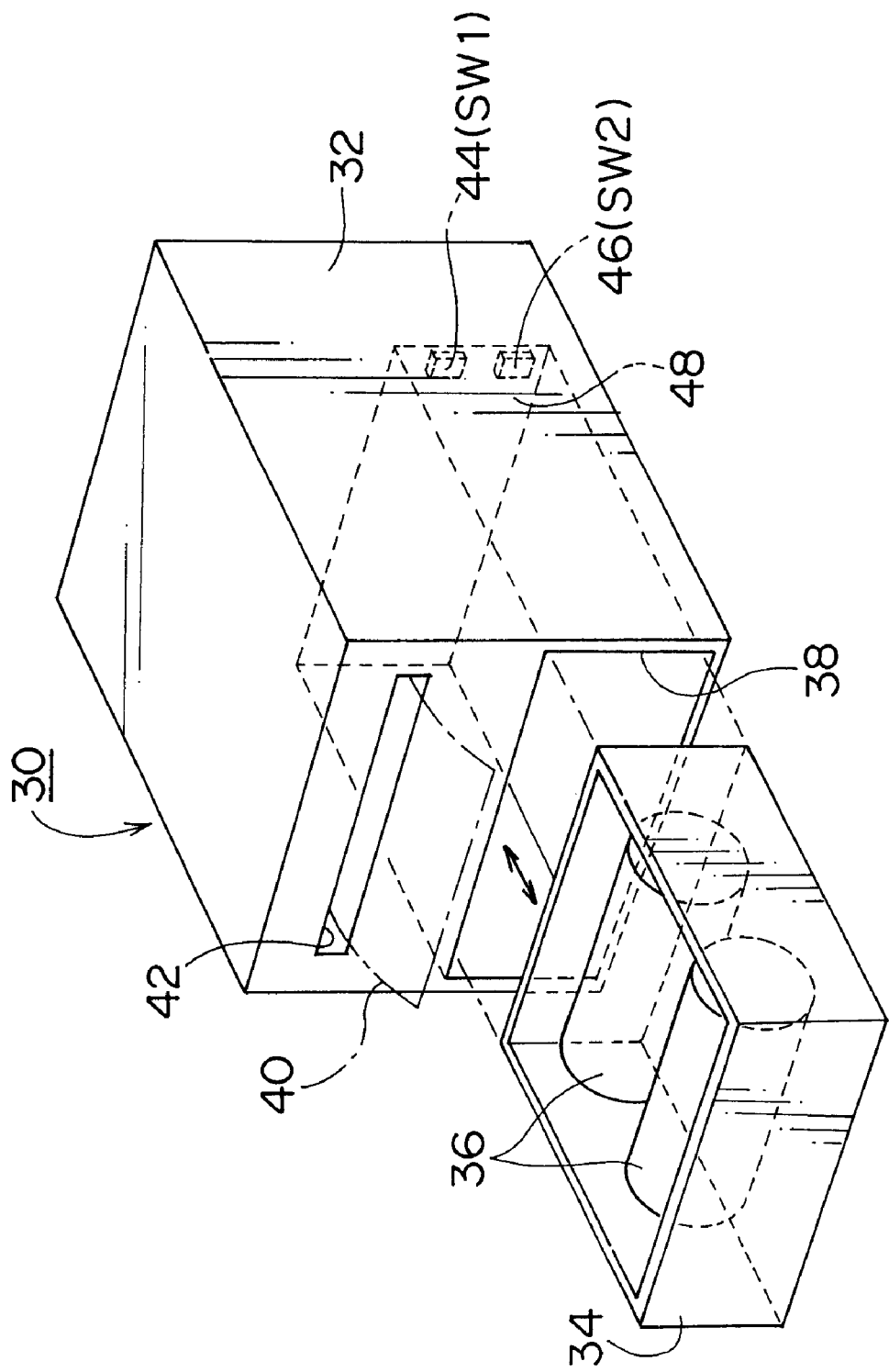
FIG. 2 is a perspective view showing a printer to which the safety device in FIG. 1 is applied.

FIG. 2 is a perspective view showing a printer 30 to which the safety device 10 in FIG. 1 is applied. The printer 30 has a paper tray 34 that can be drawn from a body 32, and the paper tray 34 can contain two rolls of paper 36. After the paper tray 34 is loaded in an entry 38 of the body 32, the paper 36 is transported along a transport route by a feed mechanism (not shown). Then, an image or the like is printed on the paper 36 by a recording head (not shown), and a cutter (not shown) cuts the paper 36 so a print 40 is ejected from an ejector 42.

The paper 36 and the paper tray 34 are not limited to those in FIG. 2. The paper tray 34 may contain only one roll, and it may contain three rolls or more. Sheets of paper 36 may be used instead of or in addition to the rolls. The printer 30 may print in the thermo-auto chrome (TA) method, the heat-transcription method (melting type or sublimation type), the laser-exposure heat-developing-transcription method (pictorography), the ink jet method, or the like.

Switch devices 44 and 46 corresponding to the switches SW1 and SW2 of the safety device 10 are arranged on a back side 48 of the entry 38 for the paper tray 34. The switch device 44 (normally-open switch) is open when the paper tray 34 is not loaded in the entry 38, and it is closed when the paper tray 34 is loaded in the entry 38. The switch device 46 (normally-closed switch) is closed when the paper tray 34 is not loaded in the entry 38, and it is open when the paper tray 34 is loaded in the entry 38.

Figure 3:
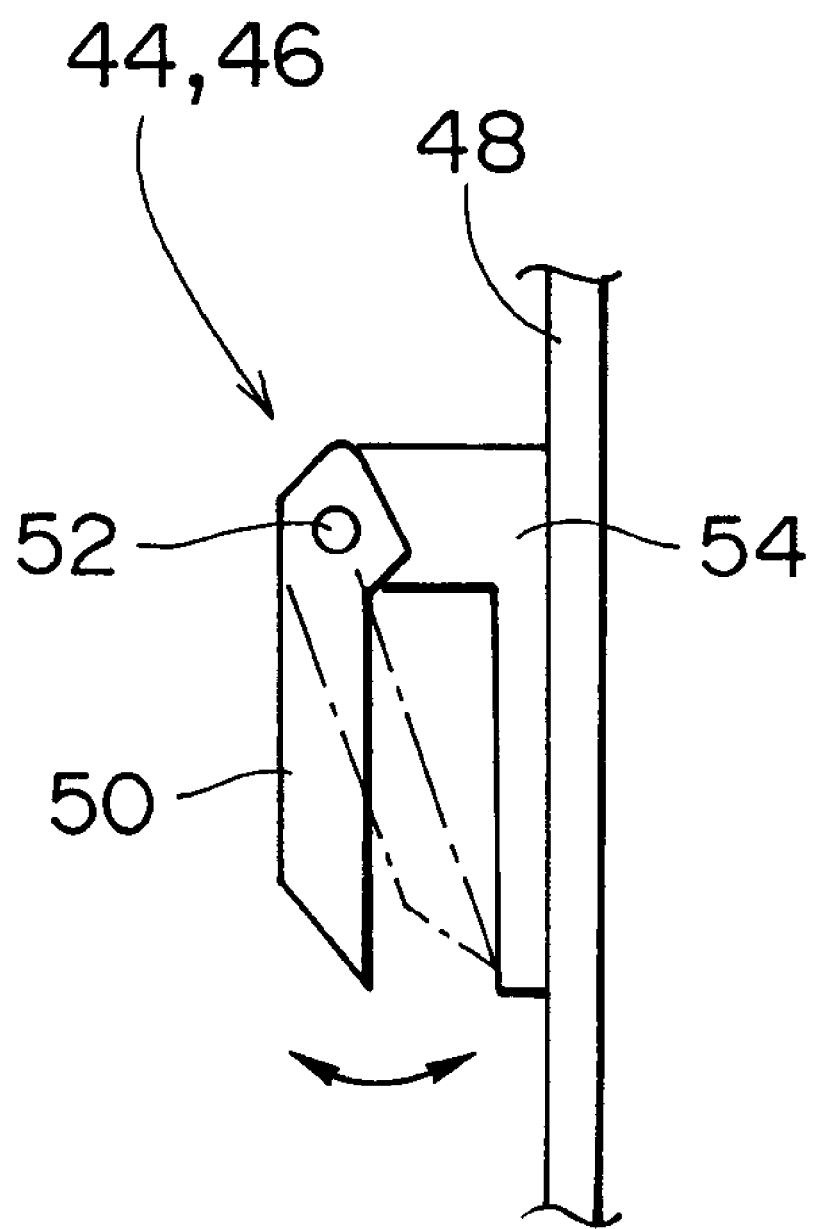
FIG. 3 is a view showing a structure of switch devices corresponding to switches SW1 and SW2.

FIG. 3 is a view showing the structure of the switch devices 44 and 46 (only one of them is shown in FIG. 3). Each of the switch devices 44 and 46 has an arm 50 that can swing about a pivot 52, and the arm 50 is forced by a forcing device such as a spring (not shown) in such a direction as to move away from a base 54 (to the left in FIG. 3).

When the paper tray 34 is loaded in the entry 38, the back of the paper tray 34 pushes the arms 50, which come in contact with the bases 54 as shown by a dashed line in FIG. 3. When the arms 50 are in contact with the bases 54, the switch device 44 (SW1) is closed and the switch device 46 (SW2) is open.

When the paper tray 34 is drawn from the entry 38, the arms 50 is moved away from the bases 54 to predetermined positions by the forcing device as shown by a dashed line in FIG. 3. At this time, the switch device 44 (SW1) is opened and the switch device 46 (SW2) is closed.

The positions of the switches SW1 and SW2 are not limited to those in FIG. 2. They may be provided on a door of the printer 30 in such a way as to be opened and closed when the door is opened and closed.

FIG. 4 is a table showing whether the switches SW1 and SW2 are open or closed when the door of the printer 30 is open and closed. The switches SW1 and SW2 may be opened or closed when the paper tray 34 is loaded in and drawn from the entry 38 as explained in FIG. 2.

As shown in FIG. 4, when the door of the printer 30 is closed (the paper tray 34 is loaded in the entry 38), the switch SW1 is closed and the switch SW2 is open. When the door is opened for some reason such as replenishment or replacement of the paper 36 and maintenance of the printer 30, the switch SW1 is opened and the switch SW2 is closed. Then, the safety device 10 stops the driving systems.

The driving systems of the printer 30 are a motor for the feed mechanism, a thermal head of a printing part, a fixing lamp, and so on. Even if the user can touch a gear of the feed mechanism or the like when the door of the printer 30 is open or the paper tray 34 is not in the entry 38, the user is safe since the safety device 10 completely stops the driving systems such as the motor.

The operation of the safety device 10 will now be explained.

FIG. 5 is a diagram showing the flows of the control by the switch SW1. When the switch SW1 is open, the driving systems are controlled with the left flow in FIG. 5. When the switch SW1 is closed, the driving systems are controlled with the right flow in FIG. 5.

When the door of the printer 30 is open (the switch SW1 is open), the transistor is OFF and the power of the buffer 18 is OFF. Thus, the buffer 18 does not output the driver controlling signal, and all the driving systems stop operating.

When the door of the printer 30 is closed (the switch SW1 is closed), the transistor is ON and the power of the buffer 18 is ON. Thus, the buffer 18 outputs the driver controlling signal, and all the driving systems operate.

FIG. 6 is a diagram showing the flows of the control by the switch SW2. When the switch SW2 is closed, the driving systems are controlled with the left flow in FIG. 6. When the switch SW2 is open, the driving systems are controlled with the right flow in FIG. 6.

When the door of the printer 30 is open (the switch SW2 is closed), the low-level input signal is inputted to the MPU 16, which determines to stop the driving systems. Then, the MPU 16 outputs the controlling signal for stopping the driving systems to the buffer 18, and the buffer 18 does not output the driver controlling signal to the driving systems, which stop operating.

When the door of the printer 30 is closed (the switch SW2 is open), the high-level input signal is inputted to the MPU 16, which determines to operate the driving systems. Then, the MPU 16 outputs the controlling signal for operating the driving systems to the buffer 18, and the buffer 18 outputs the driver controlling signal to the driving systems, which operate according to the driver controlling signal.

The safety device 10 has a device that stops the driving systems with hardware by cutting off the power supply to the buffer 18 when the switch SW1 is open and a device that stops the driving systems with software (control program of the MPU 16) when the switch SW2 is closed. Therefore, even if one of the devices breaks down, the other device stops the driving systems and the user is safe.

The safety device 10 has only one IC of the buffer 18 and only one transistor TR1, and thus its circuit is reliable and its cost is low. In addition, the safety device 10 does not have a switch that mechanically opens and closes in the circuit, and thus elements of the circuit are not easily damaged.

The MPU 16 outputs the controlling signal (Low signal) when it inputs the Low-level input signal, but the relationship between the input signal and the output signal can be changed by a program (software) of the MPU 16. The determining circuit 14 that inputs the input signal to the MPU 16 is changed according to the program.

The safety device 10 has the switches SW1 and SW2 that open and close when the door of the printer 30 is opened and closed or the paper tray 34 is loaded in and drawn from the entry 38, but sensors such as photocouplers that change output signals according to the state of an object may be used instead of the switches SW1 and SW2.

The safety device 10 is applied to the printer 30 in the embodiment, but it may be applied to an electric machine such as a shredder and a fax machine, a factory automation machine such as a machine tool and an industrial robot, a system of the factory automation machine, or the like.

According to the safety device of the present invention, the two determining devices separately determines whether or not the object is in the state that causes danger, and the safety device stops the driving systems with the software when one determining device determines that the object is in the state that causes danger and stops the driving systems with the hardware when the other determining device determines that the object is in the state that causes danger. Therefore, the safety device can completely stop the driving systems. In addition, the circuit of the safety device is simple, and thus the safety device is reliable and the cost is low.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A safety device comprising:
   a first determining device and a second determining device which separately determine whether or not an object is in a state that causes danger;
   a power supplying/cutting device which supplies power to a buffer when the first determining device determines that the object is not in the state that causes danger, and which cuts off the power supply to the buffer when the first determining device determines that the object is in the state that causes danger;
   a controlling device which outputs a controlling signal for operating a driving system to the buffer when the second determining device determines that the object is not in the state that causes danger, and which outputs a controlling signal for stopping the driving system to the buffer when the second determining device determines that the object is in the state that causes danger; and
   the buffer which outputs a driver controlling signal to the driving system to operate the driving system when the power supplying/cutting device supplies the power to the buffer and the controlling device outputs the controlling signal for operating the driving system to the buffer, and which does not output the driver controlling signal to the driving system to stop the driving system when the power supplying/cutting device cuts off the power supply to the buffer and the controlling device outputs the controlling signal for stopping the driving system to the buffer.

2. The safety device as defined in claim 1, wherein the first determining device and the second determining device are switches which open and close according to whether or not the object is in the state that causes danger.

3. The safety device as defined in claim 1, wherein the power supplying/cutting device is a transistor which turns ON and OFF according to whether or not the first determining device determines that the object is in the state that causes danger.

4. The safety device as defined in claim 1, wherein:
the buffer comprises a plurality of input/output parts; and
the safety device simultaneously stops a plurality of driving systems when at least one of the first and second determining devices determines that the object is in the state that causes danger.

5. The safety device as defined in claim 1, wherein:
the first determining device and the second determining device determine whether a door of a printer is open or closed; and
the safety device stops the driving system of the printer when the door is open.

6. The safety device as defined in claim 1, wherein:
the first determining device and the second determining device determine whether a paper tray of a printer is loaded in the printer or drawn from the printer; and
the safety device stops the driving system of the printer when the paper tray is drawn from the printer.

7. The safety device as defined in claim 1, wherein said first determining device determines that the object is in a state that causes danger when a first switch of the first determining device is in an open position, and said second determining device determines that the object is in a state that causes danger when a second switch of the second determining device is in a closed position.

8. The safety device as defined in claim 1, wherein said first determining device determines that the object is in a state that causes danger when a first sensor of said first determining device is in a first operating condition, and said second determining device determines that the object is in a state that causes danger when a second sensor of said second determining device is in a second operating condition, and wherein said first operating condition is different from said second operating condition.

9. The safety device as defined in claim 1, wherein said first and second determining devices separately determine whether or not the same object is in a state that causes danger.

10. A safety device comprising:
a first determining device and a second determining device which separately determine a state of an object;
a controlling device which outputs a control signal for controlling a driving system, the controlling device being adapted to control starting and stopping of an operation of the driving system according to a determination of the second determining device;
a buffer which receives the control signal%outputted from the controlling device and outputs an operation signal for operating the driving system according to the received control signal, the buffer having a function of power-down protection;
a power supplying device which supplies power to the buffer; and
a buffer power switching device which connects and disconnects the power supplying device to and from the buffer according to a determination of the first determining device.

11. The safety device as defined in claim 10, wherein the buffer power switching device comprises a transistor composing a power supply circuit connecting the power supplying device to the buffer, the transistor being turned on and off to make and break the power supply circuit according to the determination of the first determining device.

12. A safety device for a printer comprising:
a first determining device and a second determining device which separately determine an operating position of a first switch and a second switch of the printer, respectively;
a micro-processing unit which outputs a control signal for controlling a driving system, the micro-processing unit being adapted to control starting and stopping of an operation of the driving system according to a determination of the operation position of the second switch by the second determining device;
a buffer which receives the control signal outputted from the micro-processing unit and outputs an operation signal for operating the driving system according to the received control signal, the buffer having a function of power-down protection;
a power supplying device which supplies power to the buffer; and
a buffer power switching device which connects and disconnects the power supplying device to and from the buffer according to a determination of the operating position of the first switch by the first determining device;
wherein the buffer power switching device includes a transistor having a power supply circuit connecting the power supplying device to the buffer, the transistor being turned on and off to make and break the power supply circuit according to the determination of the first determining device.

* * * * *